June 7, 1955  T. D. BISHOP  2,710,061
APPARATUS FOR SLOTTING OR CUTTING CARDBOARD
AND THE LIKE FOR THE MANUFACTURE OF BOXES
Filed Nov. 25, 1953  3 Sheets-Sheet 1

INVENTOR
THOMAS DESMOND BISHOP
BY Henninger and Pillans
ATTORNEYS

INVENTOR
THOMAS DESMOND BISHOP

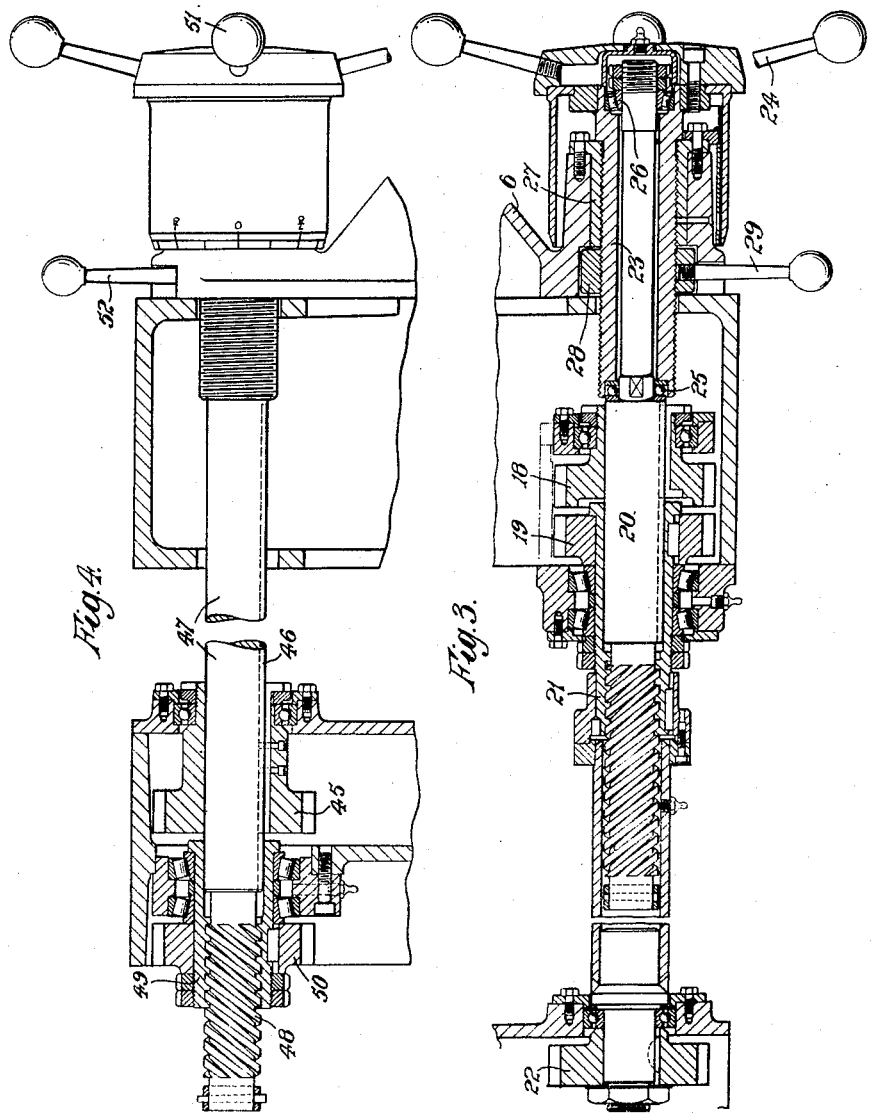

United States Patent Office 2,710,061
Patented June 7, 1955

2,710,061

APPARATUS FOR SLOTTING OR CUTTING CARDBOARD AND THE LIKE FOR THE MANUFACTURE OF BOXES

Thomas Desmond Bishop, Solihull, England, assignor to The Deritend Engineering Company Limited, Birmingham, England, a British company Application November 25, 1953, Serial No. 394,436

8 Claims. (Cl. 164—60)

This invention relates to apparatus for slotting or cutting cardboard and the like for the manufacture of boxes and is an improvement upon or modification of the apparatus as described in the specification accompanying United States application Serial No. 279,996, now Patent No. 2,701,603, issued February 8, 1955.

In the said specification the pairs of knives are each carried by one of a pair of annuli which are rotatable relative to one another to provide means of angularly adjusting the one knife relative to the other. As disclosed by that specification the annuli in the form of sleeves were carried by sub-frames which were adjustable laterally relative to the direction of travel of the cardboard or like blank through the apparatus, each sub-frame partaking of an equal and opposite movement. Such apparatus is limited in its use to the formation of not more than two parallel slots or cuts in the blank at a time since it will be appreciated that the provision of a third sub-frame between those already provided would bar the passage of the blank through the apparatus.

The object of the present invention is to provide means whereby three or more cutting units each comprising pairs of male and female knives may be utilised and independently adjusted laterally relative to one another whilst maintaining the incorporation of means for adjusting the angular setting of one of each pair of knives relative to the other from a common source and also of maintaining means for adjusting the feed mechanism relative to the angular setting of the blades.

The invention consists of apparatus for slotting or cutting cardboard and like blanks for the manufacture of boxes incorporating a plurality of cutting uints each comprising two complementary parts carrying male and female kinves respectively characterised by the association with each part of each unit of a relatively rotatable but non-axially slidable nut which engages with a screw-threaded shaft held from rotation about its own axis and passing through all the similar parts of all the units and means whereby the nuts associated with both parts of a selected unit may be rotated to effect a corresponding adjustment of the two parts of each unit transversely relative to the direction of travel of the cardboard or the like blank through the apparatus.

By way of example a convenient embodiment of the present invention will now be described with reference to the accompanying drawings on the assumption that the apparatus incorporates four units only one of which is shown and each unit comprises a pair of male knives and a pair of cooperating female knives though it will be appreciated that the construction can be applied to apparatus incorporating more or less units.

In the drawings.

Fig. 3 is a longitudinal sectional view of the means for effecting relative adjustment simultaneously to each pair of knives mounted on each part of each unit, and Fig. 4 is a part sectional view of the means for effecting relative adjustment between all the knives of the cutting units and the feed mechanism.

Figure 1:
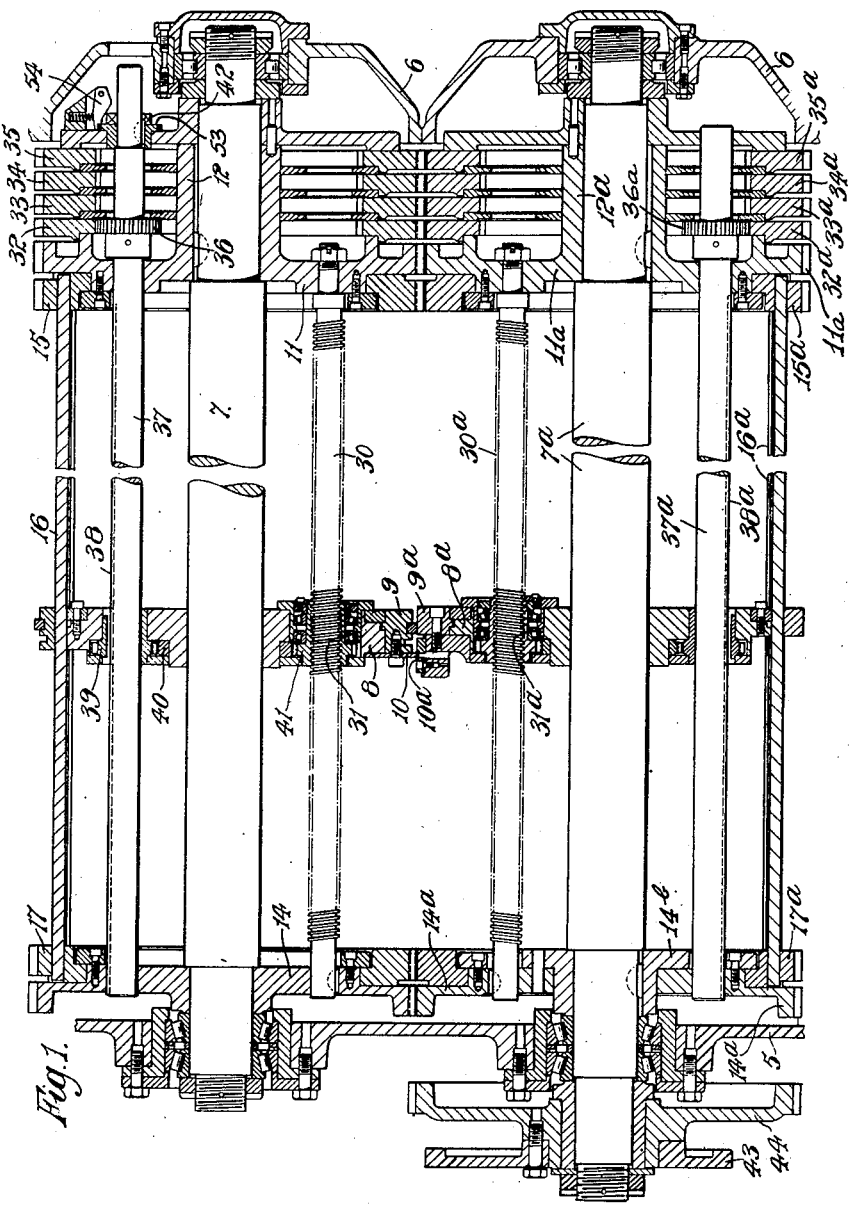
Fig. 1 represents a sectional side elevation of the apparatus, the section line being taken on the line 1—1 of Fig. 2.

Mounted upon a base plate (not shown) are a pair of end plates 5 and 6 interconnected by longitudinally extending bars (not shown) to form a framework within which the apparatus is mounted.

Journalled in the two end frames 5 and 6 are two parallel longitudinally extending main shafts 7 and 7a, the shaft 7 being disposed vertically above the shaft 7a. Mounted for sliding movement upon these shafts 7 and 7a are the four cutting units only one of which is shown. Each unit comprises two parts which are substantially similar and are mounted respectively one on the upper longitudinally extending main shaft 7 and the other on the lower longitudinally extending main shaft 7a. Since the two parts are substantially similar, complementary parts will be given the same reference numbers on both parts but those associated with the lower shaft will have the suffix a. Each part comprises an annular ring 8 rotatably mounted about the associated main shaft 7, hereinafter termed the inner annulus 8, about which in turn is mounted another annular ring 9, hereinafter called the outer annulus 9. The annuli 8 and 9 each carry a radially extending male knife that on the annulus 9 being seen at 10 whilst the annuli 8a and 9a each carry a cooperating female knife that on annulus 9a being seen at 10a.

According to the present invention, the angular setting of one male knife 10 relative to the other female knife can be adjusted from a point remote from the unit and this adjustment will automatically effect a corresponding angular adjustment of the pair of male knives 10 relative to one another, it being appreciated that this adjustment effects the angular setting of all the knives both male and female of all the four units. The mode in which this is done will become apparent from the following description.

At one end of the framework mounted about the longitudinally extending shafts 7, 7a respectively are pinions 11 and 11a hereinafter called the main drive pinions 11, 11a, which are of equal diameter and are in mesh with one another, these pinions being formed integral with sleeve-like portion 12 and 12a respectively surrounding the shafts 7 and 7a and keyed thereto the purpose of which will become apparent hereinafter.

The pinions 11, 11a have secured thereto eccentrically driving rods 13, 13a which extend parallel to the associated main shaft 7 or 7a and passes through a correspondingly shaped aperture in the inner annulus 8 or 8a of each of the parts of each of the four units which are mounted about this shaft 7 or 7a, the opposite end of the driving rod 13 or 13a being located within a pinion 14 or 14a at the other end of the framework which pinions are in mesh with one another and are mounted about the associated main shaft 7 or 7a the pinion 14a being connected to supporting hub 14b which is keyed to shaft 7a. It will thus be appreciated that any rotational motion which is imparted to one of the main driving pinions 11 or 11a will be imparted to the other main driving pinion 11 or 11a and through the driving rods 13, 13a will cause all the inner annuli 8, 8a of the cutting units to rotate in unison with their associated main shafts 7 or 7a. On the inner side of the main driving pinions 11, 11a respectively, i. e. on the side nearest the cutting units, are annular pinions 15, 15a which have an external diameter equal to the external diameter of the main driving pinions 11, 11a and these two annular pinions 15, 15a are in mesh with one another and are rotatable about shoulders on the driving pinions 11, 11a. These annular pinions 15, 15a accommodate respectively in slots the ends of driving bars 16, 16a which extend through corresponding cross-sectional apertures in the outer annuli 9 and 9a of each cutting unit associated with the same main shaft, the opposite ends of the bars being accommodated respectively in annular pinions 17 and 17a hereinafter termed a feed driving pinion 17 or 17a which are rotatable about shoulders on the pinions 14 and 14a respectively. The two feed driving pinions 17, 17a are in mesh with one another. It will be appreciated that rotational motion imparted to the annular pinion 15a will be imparted to the annular pinion 15 and thus through the driving bars 16 and 16a to all the outer annuli 9 and 9a of the four units.

Figure 2:
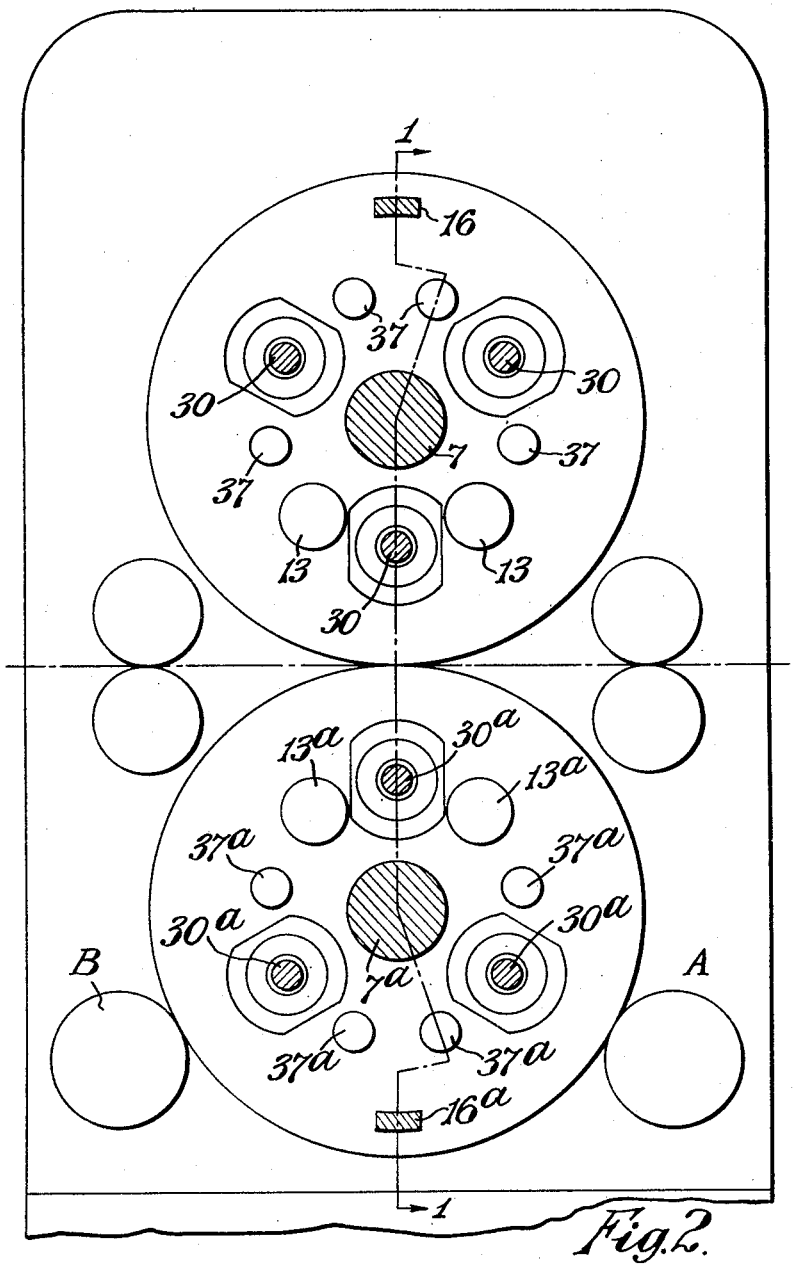
Fig. 2 is a mainly diagrammatic end view of one of the units to show the relative disposition of the various shafts in relation to the units and as seen from the right hand side of Fig. 1.

The means for imparting relative rotation to each pair of male knives and each pair of female knives simultaneously is diagrammatically illustrated at A in Fig. 2 and shown in detail in Fig. 3.

The driving pinion 11a and the annular pinion 15a are each in mesh respectively with one of a pair of pinions 18 and 19 of equal diameter. The pinion 18 is keyed to a driving shaft 20 in such a manner that rotation of the driving shaft 20 will be imparted to the pinion 18 but the driving shaft can slide axially therethrough, the pinion 18 being prevented from axial movement. The pinion 19 is keyed to a sleeve 21 surrounding the driving shaft 20 and the sleeve 21 is furnished with an internal quick or high pitch thread which meshes with an external quick or high pitch thread on the driving shaft 20. Normally the two pinions 18 and 19 are rotated together from a pinion 22 in driving engagement with a power source (not shown) and also in mesh with pinion 17a and therefore impart equal rotation to the main driving pinions 11a and 11 and the annular pinions 15a and 15. Means is provided however for imparting an axial movement to the driving shaft 20, which by virtue of the quick or high pitch thread engagement of this shaft with the surrounding sleeve 21, which is prevented from axial movement, will effect a relative rotation between the two pinions 18 and 19 which in turn will effect a relative rotation between the main driving pinions 11, 11a and the annular pinions 15, 15a and thus relative rotation between the inner annuli 8, 8a and outer annuli 9, 9a of every cutting unit so that the annular setting of every male pair of knives and every female pair of knives is adjusted simultaneously and correspondingly.

The means for imparting an axial movement to the shaft 20 is as follows:

Rotatably surrounding a reduced extension of the shaft 20 is an externally screw threaded sleeve 23 which has connected thereto handles 24 whereby it may be rotated. This sleeve 23 though freely rotatable about the shaft 20 is prevented from relative axial movement by means of anti-friction thrust bearings 25 and 26. The external screw thread of the sleeve 23 engages an internal screw thread on the sleeve 27 which is secured within the end frame 6. It will therefore be appreciated that if the handles 24 are rotated to turn the sleeve 23, the sleeve 23, together with the shaft 20 will move axially relative to the frame of the apparatus and to the sleeve 21 which is prevented from axial movement in the frame and thereby cause a rotation of the shaft 20.

28 is a locknut furnished with a handle 29 whereby the sleeve 23 can be locked at any desired setting.

Means must be provided for moving each cutting unit transversely to the direction of travel of the cardboard or like blank through the apparatus and according to this invention means is provided whereby each unit can be moved independently of the other units.

Secured respectively to each of the main driving pinions 11, 11a eccentrically are the ends of three screw-threaded shafts 30, 30a which are equi-distantly spaced radially around the main driving pinions and extend parallel to the main shafts 7, 7a and are located at the opposite end of the framework within the pinions 14, 14a and are keyed thereto so as to be non-rotatable about their own longitudinal axes.

The three screw-threaded shafts 30 each pass through the inner annuli 8 of the parts of all the cutting units mounted about the main shaft 7 and each engage with one of three internally screw-threaded nuts 31 in each inner annulus 8; whilst the three screw-threaded shafts 30a each pass through the inner annuli 8a of the parts of all the cutting units mounted about the main shaft 7a and each engage with one of three internally screw-threaded nuts 31a in each inner annulus 8a. The nuts 31 and 31a are rotatable in their respective inner annuli but are prevented from axial movement therein.

Mounted about the sleeve-like portion 12 of the main driving pinion 11 are four further annular pinions 32, 33, 34 and 35 herein-after referred to respectively as the first, second, third and fourth lateral adjustment pinions which are of equal diameter to the main driving pinion 11, and are each in mesh with one of four corresponding lateral adjustment pinions 32a, 33a, 34a and 35a mounted about the sleeve-like portion 12a of the main driving pinion 11a, these lateral adjustment pinions being on the opposite side of the main driving pinions 11, 11a to the first mentioned annular pinions 15, 15a. The lateral adjustment pinions 32, 33, 34 and 35 are each provided with internal teeth which mesh with one of four pinions 36 (only one of which is seen in the drawings) each mounted on one of four longitudinally extending spindles 37 which pass through the main driving pinion 11 and through each of the inner annuli 8 of the parts of the cutting units associated with the main shaft 7 and are accommodated at their opposite ends in the pinion 14.

In a similar manner the lateral adjustment pinions 32a, 33a, 34a and 35a are each provided with internal teeth which mesh with one of four pinions 36a (only one of which is seen in the drawings) each mounted on one of four longitudinally extending spindles 37a which pass through the main driving pinions 11a, and through each of the inner annuli 8a of the parts of the cutting units associated with the main shaft 7a and are accommodated at their opposite ends in the pinion 14a.

Since the spindles and the lateral adjustment pinions associated with both the main shafts 7 and 7a are similar the following description will relate only to the mechanism associated with the main spindle 7 though it will be appreciated that the mechanism associated with the main spindle 7a is in driving connection therewith and effects an exactly similar operation of the parts of the cutting units associated with it. Each of the lateral adjustment pinions 32, 33, 34 and 35 is in internal driving engagement with the nuts 31 on one part of one cutting unit only, but the following description applies equally to each lateral adjustment pinion and associated spindle. Each spindle 37 is furnished with a key-way 38 and passes through the inner annulus 8 of each part of the four cutting units which is mounted about the main shaft 7 but one only of these inner annuli 8 is furnished with a pinion 39 which engages the spindle in a non-rotatable but axially slidable manner. This pinion 39 in the annulus 8 is in mesh with another pinion 40 rotatably mounted about a shoulder on the annulus 8 and this latter pinion 40 is in mesh with three pinions 41 formed integral with the three nuts 31 engaging the three screw-threaded shafts 30. It will be appreciated therefore that each spindle 37 and its complementary spindle 37a are in operative engagement with one only of the cutting units.

The spindles 37 associated with the main shaft 7 are furnished at one end with dogs 42 which can be engaged with dogs on a removable crank handle. When it is desired to move for example the first unit (i. e. the unit illustrated) laterally relative to the direction of travel of the blank through the apparatus, the crank is engaged with the spindle 37 and the spindle is thereby turned. Rotation of this spindle 37 will effect a rotation of the pinion 39 engaging it in the associated part of the first cutting unit and thereby transmit rotation through pinion 40 to the three nuts 31 in this part of the first cutting unit which engage the three fixed screw shafts 30 so as to move this part of the first cutting unit axially along the main shaft 7. By virtue of the fact that the pinion 36 on this spindle 37 engages the first lateral adjustment pinion 32 and this lateral adjustment pinion 32 is in mesh with the corresponding first lateral adjustment pinion 32a and this first lateral adjustment pinion 32a is again in mesh with a pinion 36a on the requisite spindle 37a associated with the other main shaft 7a, a corresponding rotation is imparted to the spindle 37a which, in exactly similar manner, effects an equal and similar axial adjustment of the other part of the first cutting unit. There is, therefore, provided means whereby both parts of any selected cutting unit may be adjusted axially upon the main shafts 7, 7a simultaneous and correspondingly.

The feed mechanism associated with the apparatus is operated by a cam 43 which is connected to a pinion 44 which is driven from the pinion 14a by means which permits of a relative rotation between the two pinions 14a and 44 as shown diagrammatically at B on Fig. 2, and shown in detail in Fig. 4. This means comprises a pinion 45 which is in mesh with the pinion 14a and engages with a key-way 46 in the shaft 47 about which it is mounted so that rotation of the pinion 45 is transmitted to the shaft 47, though the shaft 47 is axially slidable through the pinion 45 which is prevented from axial movement. The shaft 47 has a portion provided with a quick or high pitch thread 48 which engages a quick or high pitch thread on the interior of a sleeve 49 which is prevented from axial movement and carries the pinion 50 which is in mesh with the pinion 44.

It will thus be appreciated that axial movement of the shaft 47 will effect relative rotation between the pinions 45 and 50, and thus relative rotation between the pinions 14a and 44 to adjust the timing of the feed mechanism in relation to the timing of the knives of the apparatus.

The means for moving the shaft 47 axially is not shown in detail but is exactly similar to that shown in Fig. 3 for moving the shaft 20 axially, it being understood that the handle 51 is the equivalent of the handle 24, and the handle 52 is the equivalent of the handle 29.

The ends of the spindles 37 which are provided with dogs and adapted to be engaged by the crank handles have keyed thereto toothed wheels 53 which are normally engaged by pivotally mounted spring-loaded detents 54 which prevent the rotation of these spindles. These detents are provided with a cam profile which results in a detent being automatically rocked out of engagement with the associated toothed wheel 53 when the crank handle is engaged with the dogs 42 of this spindle.

I claim:

1. Apparatus for slotting or cutting cardboard and like blanks for the manufacture of boxes comprising a frame provided with spaced apart shafts, a plurality of cutting units slidably supported on said frame about said shafts, each cutting unit comprising two complementary parts driven by said spaced shafts, said parts carrying male and female knives respectively characterized by the association with each part of each unit of a relatively rotatable but non-axially slidable nut which engages with a screw-threaded shaft held from rotation about its own axis and passing through all the similar parts of all the units and means whereby the nuts associated with both parts of a selected unit may be rotated to effect a corresponding adjustment of the two parts of each unit transversely relative to the direction of travel of the cardboard or the like blank through the apparatus, each part of each unit incorporating a pair of annuli each pair carrying one of said knives which co-operates with the complementary knife on the other part of the same unit, and means for simultaneously effecting an equal and similar rotation of one annulus of each part relative to the other annulus of the same part.

2. Apparatus for slotting or cutting cardboard and like blanks for the manufacture of boxes according to claim 1 wherein each part of each unit is provided with at least three relatively rotatable but nonaxially slidable nuts which engage each with one of an equal number of screw-threaded shafts held from rotation about their own respective axes and equi-distantly spaced radially in respect to the part of the unit whereby parallelism is maintained between the complementary parts of each unit.

3. Apparatus for slotting or cutting cardboard and like blanks for the manufacture of boxes according to claim 1 wherein the means for rotating the nuts of a unit is operable from a point remote from the said unit.

4. Apparatus for slotting or cutting cardboard and like blanks for the manufacture of boxes according to claim 1, wherein there are provided a plurality of spindles corresponding in number to the number of parts of the cutting units, each spindle whilst passing through all similar parts of the cutting units being provided with means for rotating the nut of one unit only, and positioned in driving engagement with the complementary spindle passing through the complementary parts of the cutting units whereby each of the two parts of each cutting unit are adjusted simultaneously and correspondingly.

5. Apparatus for slotting or cutting cardboard and like blanks for the manufacture of boxes according to claim 1, wherein there are provided a pair of spaced, parallel positioned main shafts about which the complementary parts of each cutting unit are respectively slidably mounted, and a plurality of rotatable spindles associated with each main shaft corresponding in number to the number of parts associated with the shaft which spindles pass through each part mounted on the same main shaft and are each in driving engagement with the nuts of one part only but are in driving engagement with the complementary spindle associated with the other main shaft which is in driving engagement with the nuts of the complementary part of the same cutting unit, whereby rotation of one spindle will effect a corresponding adjustment of the two complementary parts of one unit transversely relative to the direction of travel of the blank.

6. Apparatus for slotting or cutting cardboard and like blanks for the manufacture of boxes, according to claim 1, wherein each part of each unit incorporates a pair of annuli each carying a knife which co-operates with a complementary knife on the other part of the same unit, and wherein means is provided for simultaneously effecting an equal and similar rotation of one annulus of each part relative to the other annulus of the same part.

7. Apparatus for slotting or cutting cardboard and like blanks for the manufacture of boxes according to claim 1, wherein means is provided for adjusting the timing of blank feeding mechanism relative to the timing of the knives of the cutting units.

8. Apparatus for slotting or cutting cardboard and like blanks for the manufacture of boxes according to claim 3, wherein the spindles associated with the one main shaft are each provided with means whereby they may be independently rotated.

References Cited in the file of this patent

UNITED STATES PATENTS

| 325,812 | Bridgman | Sept. 8, 1885 |
| 801,036 | McCorkindale | Oct. 3, 1905 |
| 1,850,800 | Langston et al. | Mar. 22, 1932 |
| 1,850,801 | Langston et al. | Mar. 22, 1932 |
| 1,850,802 | Langston et al. | Mar. 22, 1932 |

FOREIGN PATENTS

| 3,521 | Great Britain | Feb. 17, 1896 |